Patented Apr. 23, 1929.

1,710,266

UNITED STATES PATENT OFFICE.

MEILACH MELAMID, OF FREIBURG, GERMANY, ASSIGNOR TO CANADIAN ELECTRO PRODUCTS COMPANY, LIMITED, OF MONTREAL, CANADA, A CORPORATION OF CANADA.

PROCESS FOR THE PREPARATION OF RESINS.

No Drawing. Application filed January 26, 1921, Serial No. 440,212, and in Germany May 17, 1920.

My invention relates to improvements in the process for the manufacture of resinous substances and a tanning agent and to the new products obtained by said process.

It has been ascertained that a reaction takes place when acetylene acts upon cresol, heavier phenols, naphthalene, $\alpha$- or $\beta$-naphthalenesulpho-acid and other tar components, in the presence of acids and of a catalyst, which reaction leads to the formation of resinous substances, while substances are obtained as secondary products which can easily be converted into a tanning agent.

If acetylene is admitted for a considerable period of time into a mixture of cresols with some acid, such for example as sulfuric acid, or to the said substances after sulphonation, and in the presence of a catalyst and if the mixture is submitted to a distillation in the vacuum, it has been found that in addition to small first runnings which consist of cresols, first a distillate is obtained that has a high boiling point and is completely soluble in water when sulphonated, and precipitates a glue in aqueous solution and secondly a residue is obtained which consists of a hard, transparent, light-coloured resin which is soluble in alcohol and benzol.

It seems as if, first of all the acetylene is combined with the cresol and afterwards a condensation takes place of the cresol derivatives into substances, having a high boiling point and into hard substances of a resinous character.

Furthermore, it has been ascertained that substances which strongly precipitate glue and which are entirely soluble in water are obtained when cresol in the presence of an equivalent quantity of sulphuric acid or the sulphonated mass obtained from cresol and an equivalent quantity of sulphuric acid is treated with acetylene in the presence of a catalyst. In this manner, the dissolution, removal of acid, drying and distillation are rendered unnecessary, and an excess of sulphuric acid is avoided. Apart from this, the sulphonation of fluid cresol can be effected in an easier manner than the sulphonation of a solid substance. The product of reaction between cresols and acetylene can be sulphonated without any preliminary washing and distillation.

Moreover, the heavier phenols which are obtained from anthracene oil can be converted into substances which are soluble in water and strongly precipitate glue by a treatment with sulphuric acid and acetylene in the presence of a catalyst.

The operation can also be effected in two phases, in this manner that either the phenols are sulphonated first of all until they become soluble in water and then the sulphonated mass is treated with acetylene in the presence of a catalyst or the acetylene is caused to act on the phenols in the presence of sulphuric acid and of a catalyst and the product of the reaction is sulphonated with concentrated sulphuric acid until it becomes soluble in water.

In any case, tanning substances are obtained which strongly precipitate glue.

The same reaction between cresols and acetylene in the presence of a catalyst may be applied to other substances and is capable of various modifications.

For instance, it has been ascertained that by a simultaneous action of concentrated sulphuric acid and acetylene upon naphthalene in the presence of a catalyst at 40–120°, substances are obtained which are entirely soluble in water and precipitate glue.

The same result is obtained when acetylene is caused to act in the presence of a catalyst upon previously prepared $\alpha$- or $\beta$-naphthalenesulfonic acid. Instead of separating the sulfonic acids it is possible to use the sulphonated mass which is obtained when naphthalene is sulphonated by means of concentrated sulphuric acid, to add a catalyst and to treat the mass with acetylene.

In this connection it is not necessary to remove the main portion of the excess of sulphuric acid.

Examples of a mode of carrying the invention into effect:

1. 100 parts of industrial cresol are added after cooling to about 20 parts of 50% sulphuric acid and 3 parts of mercury salts and ferric salts. Acetylene is admitted with stirring for some time as a slow current at the temperature of the room. The viscous product is suitably dissolved in benzol, separted from the catalyst and sulphuric acid by means of filtration and washing with water, is dried and submitted to fractional distillation in the vacuum. Up to 100° cresols pass over together with benzol, a fluid distillate passes up to 200° which forms a substance which precipitates glue. It is soluble in water when treated for a short time with an equal quantity of 100% sulphuric acid. The residue hardens into a hard, transparent, yellow, odourless resin.

2. 100 grs. of industrial cresol mixture are heated with 95 grs. of concentrated sulphuric acid for 4–5 hours on the water bath. About 3 grs. of mercury oxide are added to the sulphonated mass and acetylene admitted during about 24 hours. After the product of reaction has been dissolved in water and the mercury has been filtered off, the tanning solution is obtained.

3. 100 grs. cresol, 10 grs. concentrated sulphuric acid, 15 cc. of water and 3 grs. of mercury oxide are treated with acetylene gas in the cold, with stirring. The thick, viscous mass is heated gently with about 80–90 grs. of concentrated sulphuric acid until it becomes soluble in water.

After solution in water and filtration from the grey precipitate of mercury, the tanning solution is obtained.

4. 100 grs. heavy phenols are mixed with an equal quantity of concentrated sulphuric acid and 3 grs. of mercury oxide and treated during about 24–30 hours with acetylene gas at 50–100°. The product of reaction is dissolved in water, decanted from the mercury and the small quantities of undissolved particles filtered if necessary in order to remove the particles of deposit of mercury which are still floating.

The solution precipitates much glue.

5. 100 grs. of heavy phenols are sulphonated at about 80 to 90° with an equal quantity of concentrated sulphuric acid until they become soluble in water. Then 3–5% mercury oxide is added and acetylene is admitted at about 30–40°.

The operation continues as described in Example 3.

6. Acetylene is led into 100 grs. of heavy phenols at the temperature of the room in the presence of about 20%–50% sulphuric acid and 3–5% of mercury oxide during 24 hours. Then it is sulphonated with concentrated sulphuric acid (same quantity as in Example 3) on the water-bath until it becomes soluble in water. The operation is continued as described above.

7. 100 grs. of naphthalene and 3, 5 grs. of mercury oxide are added to 200 grs. of concentrated sulphuric acid at 40° C., and acetylene is led in slowly with stirring at 40° C. during 24–30 hours. The sulphonated mass is dissolved in water, neutralized, and separated by filtration from naphthalene and mercury compounds. It is separated from the sodium sulphate by crystallization.

8. Acetylene is slowly led into a solution in a little quantity of water of 100 grs. naphthalene sulfonic acid in the presence of 5 grs. of concentrated sulphuric acid and 3 grs. of mercury oxide, during 24–30 hours. The solution is further treated as described above.

9. 100 grs. of naphthalene are sulphonated with 200 grs. sulphuric acid at 40° C. during 5 hours. The main portion of sulphuric acid is thereupon neutralized with lime. The sulpho-acids and the remaining portion of the sulphuric acid are mixed with 3 grs. of mercury oxide and stirred during 24–30 hours in a slow current of acetylene. It is also possible to admit acetylene without it being necessary previously to separate the main portion of acid excess.

I claim:

1. The process of producing aromatic compounds which consists in causing a reaction of acetylene with aromatic coal tar components containing hydrogen replaceable by radicals in presence of an acid and a catalyst, and separating the catalyst from the product of the reaction.

2. The process of producing aromatic compounds which consists in reacting upon aromatic coal tar components containing hydrogen replaceable by radicals with acetylene and an acid in presence of a catalyzer and separating said catalyzer from the product of reaction.

3. The process of producing aromatic compounds which consists in causing a reaction of acetylene with aromatic coal tar components containing hydrogen replaceable by radicals and an acid containing sulpho-groups, and in the presence of a catalyst, and separating said catalyst from the product of reaction.

4. The process of producing aromatic compounds which consists in treating the acid-combining hydrocarbon components of anthracene oil with acetylene and an acid in presence of a catalyzer and separating the catalyzer from the product of the reaction.

5. The process of producing aromatic compounds which consists in treating the acid-combining hydrocarbon components of anthracene oil with acetylene and an acid containing sulpho-groups in presence of a catalyzer, separating the catalyzer from the product of the reaction.

6. The process of producing aromatic compounds which consists in treating acid-combining hydrocarbon components of anthracene oil with acetylene and an acid containing sulpho-groups in presence of a condensing agent, and eliminating a volatile distillate and a resinous body from the product of reaction.

7. The process of producing aromatic compounds which consists in treating acid-combining hydrocarbon components of anthracene oil with acetylene and an acid containing sulpho-groups in presence of a catalyst, separating the catalyst from the product of reaction, and eliminating a distillate and a resinous body from said reaction product.

8. The process of producing aromatic compounds which consists in sulphonating aromatic coal tar components containing hydrogen replaceable by radicals, and reacting thereon with acetylene and a catalyst in acid solution, and separating the catalyst from the product of reaction.

9. The process of producing aromatic compounds which consists in treating acid-combining aromatic hydrocarbon compounds with sulphuric acid, and reacting upon the sulphonated bodies with acetylene and a catalyst in acid solution, and removing the catalyst from the product of reaction.

10. The process of producing aromatic compounds which consists in sulphonating acid-combining hydrocarbon components of anthracene oil, treating the sulphonated substances with acetylene and a catalyst in presence of acid, separating the catalyst from the product of reaction, and eliminating a distillate and a resinous body from the product of reaction.

11. The process of producing aromatic compounds which consists in treating aromatic acid-combining hydrocarbon compounds with acetylene and an acid containing sulpho-groups in the presence of a catalyst, removing the catalyst from the product of reaction, and separating a high boiling distillate from the product of reaction, and eliminating a resinous body from the product of reaction.

12. The process for producing aromatic compounds, which consists in causing a reaction of acetylene with phenols in presence of an acid and a catalyst, and separating the catalyst from the product of the reaction.

13. The herein described process of producing a product from cresol and acetylene, which consists in causing a reaction of cresol, an acid, acetylene, and a catalyst, and separating the catalyst from the product of the reaction.

14. The herein described process of producing a product from cresol and acetylene, which consists in causing a reaction of cresol and an acid, adding to the product of the reaction a catalyst and acetylene, and separating the catalyst from the product of the reaction.

15. The herein described process of producing a product from cresol and acetylene, which consists in causing a reaction of cresol, an equivalent quantity of sulfuric acid, acetylene, and a catalyst, and separating the catalyst from the product of the reaction.

16. The herein described process of producing a product from cresol and acetylene, which consists in causing a reaction of cresol, and an equivalent quantity of sulphuric acid, adding to the product of the reaction a catalyst and acetylene, and separating the catalyst from the product of the reaction.

17. The herein described process of producing a product from cresol and acetylene, which consists in causing a reaction of cresol, an equivalent quantity of sulphuric acid, acetylene, and a catalyst sulphonating the product of the reaction and separating therefrom the catalyst.

18. The herein described process of producing a product from cresol and acetylene, which consists in causing a reaction of cresol, an acid, acetylene, and a catalyst, and subjecting the product to fractional separation.

19. The herein described process of producing a product from cresol and acetylene, which consists in causing a reaction of cresol, an acid, acetylene, and a catalyst, and subjecting the product to distillation under the vacuum.

20. The herein described product, which is a hard, transparent yellow, odourless resin, and which is produced by causing a reaction of cresol, an acid, acetylene, and a catalyst, subjecting the product of the reaction to distillation under the vacuum, and removing the catalyst from the residue.

21. A tanning agent, having a boiling point of about 200 degrees centigrade and precipitating glue, and combinable with sulphuric acid to a water-soluble compound, and constituting a reaction product of acetylene with aromatic acid-combining hydrocarbon compounds 22. A tanning agent, capable of precipitating glue, and soluble in water, and comprising the sulphonated reaction product of acetylene with aromatic acid-combining hydrocarbon compounds.

23. A process of making resins which comprises reacting together a phenolic body and a body containing the group —C≡C— in the presence of a catalyst.

24. A process of making resins which comprises reacting together a phenolic body and a body containing the group —C≡C— in the presence of sulphuric acid and a mercury compound.

25. A process of making resins which comprises reacting together a phenolic body and acetylene in the presence of a catalyst.

26. A process of making resins which comprises reacting together a phenolic body and acetylene in the presence of sulphuric acid and a mercury compound.

27. A resinous product resulting from the reaction of acetylene and a phenolic body.

28. A composition of matter comprising the product resulting from the reaction of acetylene and a phenolic body in presence of a catalyst developed in the reaction from mercury oxide and sulphuric acid.

29. A composition of matter resulting from the reaction of a phenolic body and acetylene at a temperature of 50° to 100° centigrade.

In testimony whereof I hereunto affix my signature.

Dr. M. MELAMID.